(12) United States Patent
Griesmeier et al.

(10) Patent No.: US 7,337,863 B2
(45) Date of Patent: Mar. 4, 2008

(54) CIRCUIT ARRANGEMENT FOR THE CONTROL OF AT LEAST ONE ELECTRIC MACHINE

(75) Inventors: Uwe Griesmeier, Markdorf (DE); Jürgen Kett, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/264,814

(22) Filed: Nov. 1, 2005

(65) Prior Publication Data
US 2007/0023212 A1   Feb. 1, 2007

(30) Foreign Application Priority Data
Nov. 3, 2004   (DE) .................. 10 2004 053 074

(51) Int. Cl.
*B60K 1/00* (2006.01)
(52) U.S. Cl. ..................... 180/65.1; 180/65.3
(58) Field of Classification Search ........... 180/65.5, 180/65.2, 65.3, 65.6, 65.7, 65.8; 322/38, 322/25; 318/139, 375, 34; 320/116, 104
See application file for complete search history.

(56) References Cited
U.S. PATENT DOCUMENTS

| | | | | |
|---|---|---|---|---|
| 5,365,153 A | * | 11/1994 | Fujita et al. .............. 318/34 |
| 5,466,998 A | * | 11/1995 | Kinoshita et al. ........... 318/375 |
| 5,517,401 A | * | 5/1996 | Kinoshita et al. ............ 363/98 |
| 5,633,577 A | * | 5/1997 | Matsumae et al. ............ 322/37 |
| 6,057,669 A | * | 5/2000 | Lai et al. .................... 320/116 |
| 6,708,788 B2 | * | 3/2004 | Kuwayama ............... 180/65.2 |
| 6,831,429 B2 | * | 12/2004 | Fu ............................. 318/139 |

FOREIGN PATENT DOCUMENTS

DE   199 35 873 A1   3/2001
DE   102 26 308 A1   12/2003

* cited by examiner

*Primary Examiner*—Hau Phan
(74) *Attorney, Agent, or Firm*—Davis Bujold & Daniels, P.L.L.C.

(57) ABSTRACT

The objective of providing a circuit arrangement for the control of at least one electric machine (1), which is suitable for also enabling operating conditions of the electric machine (1) that demand high power-peaks of short duration, is essentially achieved in that the electric machine (1) can be connected via a DC/AC converter (2) and at least one switching device (3) to at least two different electrical energy storage devices (I, II), one storage device (I) being designed as a storage device for comparatively long-lasting power demands and the other storage device (II) as a storage device for short and high power-peaks.

14 Claims, 2 Drawing Sheets

CIRCUIT ARRANGEMENT FOR THE CONTROL OF AT LEAST ONE ELECTRIC MACHINE

This application claims priority from German Application Serial No. 10 2004 053 074.2 filed Nov. 3, 2004.

FIELD OF THE INVENTION

The invention concerns a circuit arrangement for the control of at least one electric machine.

BACKGROUND OF THE INVENTION

DE 199 35 873 A1 discloses a circuit arrangement for a hybrid vehicle which has a traction battery, an electric motor and an internal combustion engine which works independently thereof. The circuit arrangement, which serves on the one hand to drive the electric motor by means of the accumulator and on the other hand to charge the latter, comprises a direct voltage intermediate circuit and a first DC/AC converter which, for its part, is connected to the electric motor. In addition, a second DC/AC converter is present in the circuit arrangement, which is connected, on the one hand, to the direct voltage intermediate circuit and, on the other hand, to a generator associated with the combustion engine for charging the accumulator during braking operation of the vehicle. Furthermore, a mains-connection switching circuit is provided for charging the accumulator when the vehicle is at rest. The purpose of this circuit arrangement in the hybrid vehicle is to enable the accumulator to be charged both when the vehicle is being driven and when it is at rest.

From DE 102 26 308 A1 an electrodynamic drive device for a motor vehicle is known, which comprises a combustion engine, an electric machine that can operate as a motor/generator, an electrical energy storage device and a control and regulation system which monitors the charge condition of the electric energy storage device, for example an accumulator, and recognizes when the electrical energy storage device has reached a specifiable state of charge.

During this the electric machine is either supplied with electric power from the electrical energy storage device for motor operation or it feeds electrical energy into the storage device by operating as a generator. In addition, the motor vehicle's electrical system comprises at least one electricity consumer which, for its part, can be connected to the electrical drive device when the specified charge condition of the electrical energy storage device has been reached, particularly during generator operation, so that it consumes excess electrical energy.

The known technical solutions do not give any indication of how operating conditions, for example of a vehicle, can be managed appropriately when the conditions demand high drive-power peaks of short duration. Such operating conditions exist, for example, when accelerating for overtaking purposes or on uphill slopes, conditions which for their part entail corresponding torque increases of the drive system. The invention described below addresses this matter.

The purpose of the present invention is to provide a circuit arrangement for the control of at least one electric machine, which is suitable for also enabling operating conditions of the electric machine that entail high power-peaks of short duration. The circuit arrangement must also be designed for use in a hybrid motor vehicle.

SUMMARY OF THE INVENTION

The invention is based on the recognition that conventional accumulators are rather unsuitable for any necessary high power-peak demands of short duration by a consumer such as an electric motor.

Accordingly, the main feature of the circuit arrangement according to the invention for the control of an electric machine in a hybrid motor vehicle, is that the said electric machine can be connected via a DC/AC converter and at least one switching device to at least two different electrical energy storage devices I and II, one storage device I being designed for comparatively long-lasting power demands and the other storage device II being designed as a storage device for brief and high power peak demands.

A further development of the invention provides that the storage device I for long-lasting power demands consists of an electric accumulator such as a conventional battery, while the storage device II for short and high power-peaks consists of a condenser unit, for example a so-termed "supercaps".

In a particularly advantageous way, the above measure makes it possible to make available a higher power of the electric machine in a very short time when necessary. Likewise, the life of the storage device I or accumulator is extended considerably, since substantially less energy conversion takes place in it.

As regards the switching device, this can on the one hand be formed by a switching power semiconductor with a power diode. In this, the power diode is preferably an integral part of the switching semiconductor. On the other hand, it can also be expedient for the switching device to be a bi-directional switchable semiconductor power switch.

As the invention further provides, the switching device can be arranged inside a housing of the DC/AC converter, this enabling the structure to be simplified and also the coolants, supply voltages, etc., associated with the circuit of the DC/AC converter to be used for the switching device as well. Besides, all other signals required for the control of the electric machine are available in the DC/AC converter.

It is also proposed to construct the electric machine so that it can operate as an electric motor and/or as a generator. Such electric machines have also become known as starter generators.

For operating situations in which the electric machine is operated as an electric motor, the switching device is designed such that short and high power-peaks can be covered from the storage device II and the storage device I contributes to supplying power to the electric machine mainly for long-lasting power demands.

For operating situations in which a lot of energy has to be converted in a short time, the switching device is designed such that energy conversion can be transferred from storage device I to storage device II.

For operating situations in which, in contrast, the electric machine is operated as a generator, the switching device is designed such that recharging of both storage devices I, II can take place.

A further aspect of the invention is that the electric machine consists of a drive machine and/or a generator of a motor vehicle.

It can also be provided that the voltage range of the vehicle's electrical system and the storage device I and the voltage range of the storage device II overlap, such that for significant operating time fractions the voltage in the storage device II is chosen higher than in storage device I.

In this, it is preferably provided that the voltage range of the vehicle's electrical system incorporating the storage device I is set to between about 21 V and 28 V, while the voltage range of the storage device II is between about 21 V and 48 V, but mainly between about 29 V and 48 V.

BRIEF DESCRIPTION OF THE DRAWINGS

The invention will now be described, by way of example, with reference to the accompanying drawings in which.

DETAILED DESCRIPTION OF THE INVENTION

Figure 1:
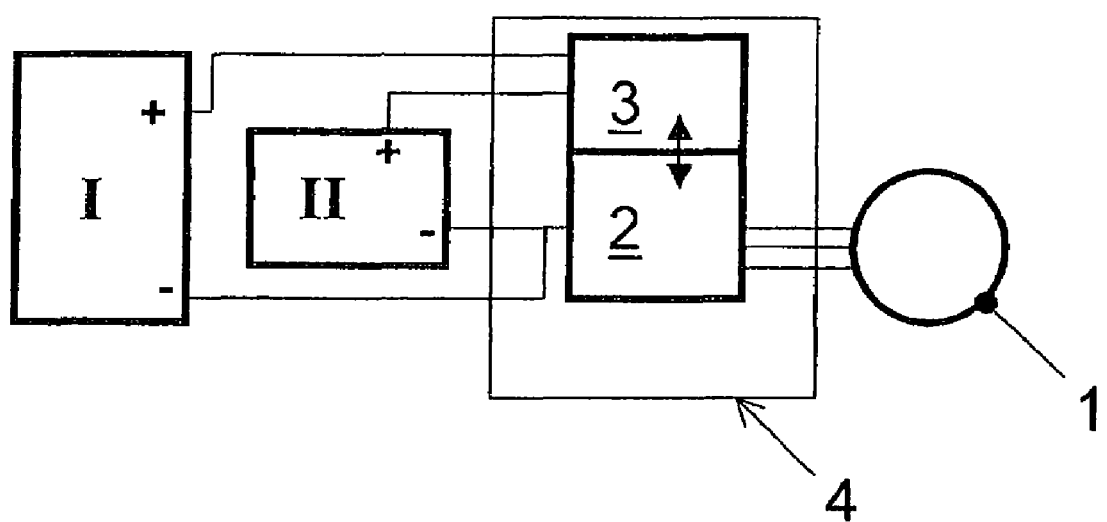
FIG. 1 is a schematic representation of the circuit arrangement according to the invention.

Thus, FIG. 1 illustrates first the circuit arrangement for the control of at least one electric machine 1, shown on its own, preferably in the form of an asynchronous or synchronous machine, such that the electric machine 1 can be connected to an energy supply in a manner known as such via a conventional DC/AC converter 2, whose features and mode of action have long been familiar to those with knowledge of the field, and in addition via at least one switching device 3.

According to the invention the energy supply consists of two different electrical energy storage devices I, II, one device I being designed as a storage device for long-lasting power demands and the other device II as a storage device for short and high power-peak demands.

By way of the switching device 3 it is ensured that when the electric machine 1 is operated as an electric motor, short and high power-peak demands are covered from the storage device II, while the storage device I contributes mainly towards supplying electricity during long-lasting power demands.

In addition, the switching device 3 is designed such that in operating situations when a large amount of energy has to be converted while the electric machine 1 is operating as an electric motor, electrical energy can be transferred from the device I to the device II.

The storage device I for long-lasting power demands preferably consists of a conventional accumulator, the term "accumulator" being understood to mean not only an individual accumulator, but also a plurality of individual accumulators assembled into an accumulator block. Suitable accumulators are not only lead accumulators, but also nickel metal hydride, zinc, sodium-nickel chloride-lithium-ion accumulators and suchlike.

In contrast, the storage device II for short and high power-peaks consists of a powerful condenser unit or similar, which as a rule does indeed operate at a higher voltage level compared with the storage device I, but has a lower energy content. Preferably the high-power condensers, also known as "supercaps", are used for this, which for their part, according to the present state of development comprise essentially an aluminum electrode onto which a layer of activated carbon powder is applied. The particular advantage of such "supercaps" is considered to be that they can deliver the desired brief energy boost particularly effectively. Furthermore, in relation to the "supercaps" it is regarded as advantageous that they can be charged within three to five minutes and their life is up to approximately 2 million charging cycles. In contrast to ordinary accumulators, such high-power accumulators do not wear out, since they do not involve any chemical processes but operate on the basis of purely physical action principles.

In operating situations when, in contrast with those explained above, the electric machine 1 is operating as a generator, the switching device 3 is designed such that recharging of the two storage devices I, II can also take place.

As the switching device 3, according to a preferred embodiment a switching power semiconductor, such as a so-termed "MOSFET" (metal oxide semiconductor) or an IGBT (insulated gate bipolar transistor), in either case with a power diode, which are already known as such and need not, therefore, be described or illustrated further, gives satisfactory results, the power diode being expediently an integral part of the power semiconductor.

Likewise, it is conceivable and within the scope of the invention for the switching device 3 to be a bi-directionally operating power semiconductor switch, known in its own right, with which a high level of control freedom is obtainable since these can pass electric current in two directions.

As can also be seen from FIG. 1, the DC/AC converter 2 and the switching device 3 are preferably arranged in a common housing 4. As already explained earlier, this advantageously simplifies the structure and, in addition, enables the coolants, supply voltages, etc. associated with the circuit of the DC/AC converter 2 to be used for the switching device as well, while all other signals required for the control of the electric machine 1 are also already available therein.

Figure 2:
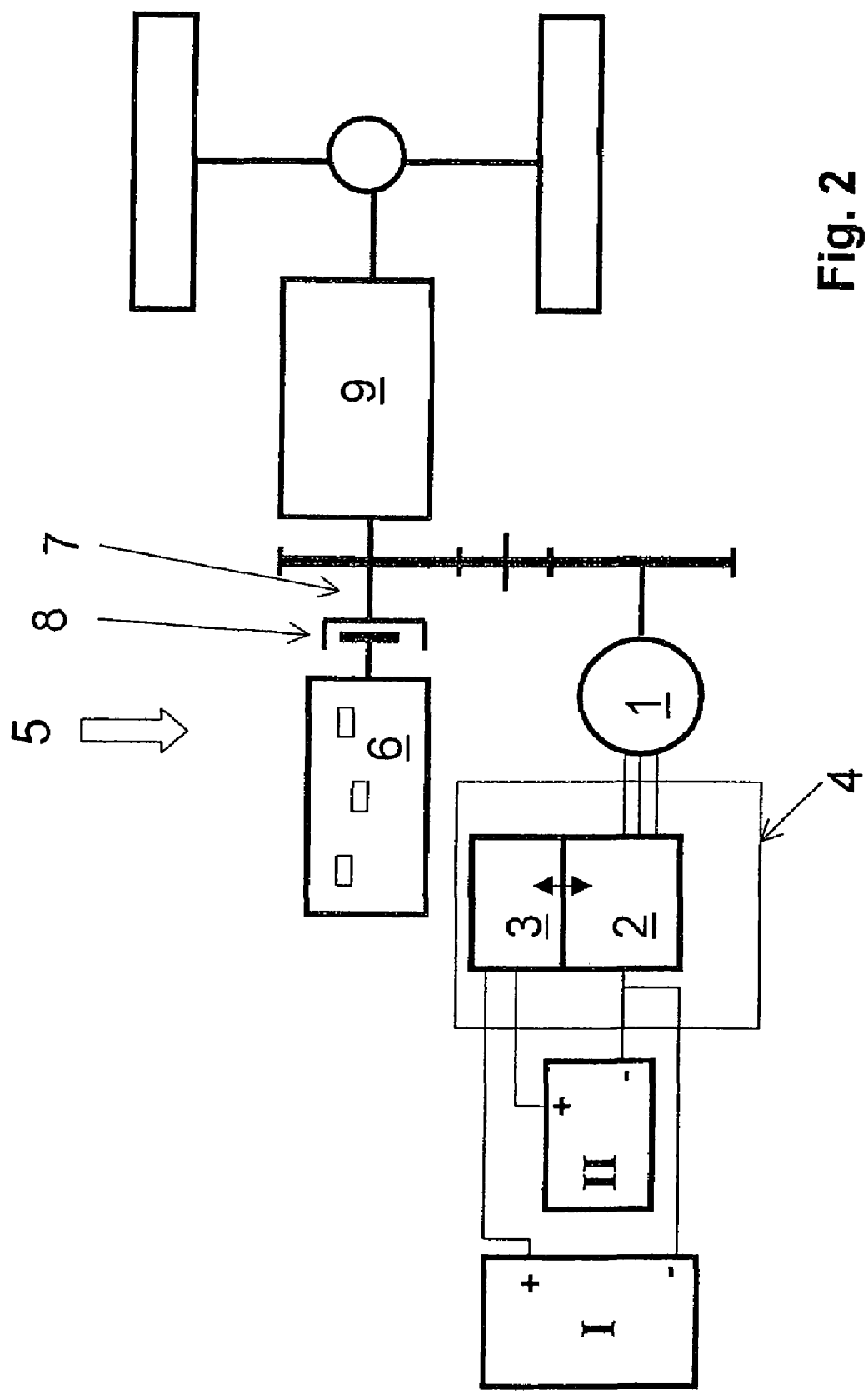
FIG. 2 is a circuit arrangement of FIG. 1 used in a drive configuration of a hybrid-drive vehicle having a combustion engine and an electric machine.

FIG. 2 illustrates a preferred application of the circuit arrangement according to the invention, namely such that it is integrated in a hybrid drive system 5 of a motor vehicle which comprises an internal combustion engine 6 and at least one electric machine 1, the latter being able to be operated as a drive motor and/or as a generator.

Accordingly, a parallel arrangement of the combustion engine 6 and the electric machine 1 in the drive train 7 of the vehicle 5 is shown, such that in this case both mechanical uncoupling means for the combustion engine 6 by a clutch mechanism 8 known as such, and also a transmission 9, preferably a gearshift transmission, are provided.

This drive train configuration enables the most varied drive variants to be implemented, such that in a manner known in its own right the electric machine 1 can either be operated as a drive motor on its own, or in combination with the combustion engine 6. In the latter situation the electric machine serves to boost the drive power of the combustion engine 6, and in particular with the help of the storage device II any necessary brief power-peak demands can be covered.

Advantageously, the electric machine 1 can also be operated as a generator and is, therefore, able to charge the energy storage devices I and II.

Investigations have shown it appropriate for the voltage range of the vehicle's system which incorporates the storage device I (accumulator) and the voltage range of the storage device II (condenser unit) to overlap, such that for substantial time fractions of the vehicle's operation the voltage in the storage device II is chosen appreciably higher than in the storage device I.

In this regard the voltage range of the electrical system with the storage device I is preferably set to between about 21 V and 28 V, while the voltage range of the storage device II is between about 21 V and 48 V mainly, however, between 29 V and 48V.

Other applications of the circuit arrangement according to the invention are possible, such as to control the electric machine 1 of an exclusively electrically operated vehicle by means of a circuit arrangement according to the invention (not described in more detail).

Likewise, such a circuit arrangement can be used for the control of a current generating aggregate (not illustrated further) powered by means of a combustion engine 6, for example an emergency generator. In the event of any high energy demands this enables reaction by virtue of the circuit arrangements since an electric motor is integrated which, for its part, covers any high drive-power demands, thanks to which the combustion engine 6 of the emergency generator can advantageously be operated at a constant speed around the engine's optimum value from the standpoint of its efficiency.

REFERENCE NUMERALS

I Electrical energy storage device, accumulator
II Electrical energy storage device, condenser
1 electric machine
2 DC/AC converter
3 switching device
4 housing
5 hybrid motor vehicle
6 internal combustion engine
7 drive train
8 clutch mechanism
9 transmission

The invention claimed is:

1. A circuit arrangement, for the control of at least one electric machine (1), comprising:
   a first electrical energy storage device (I) and a second electrical energy storage device (II);
   a DC/AC converter (2) and at least one switching device (3) for providing electrical energy from the first and the second electrical energy storage devices (I, II) to the at least one electrical machine (1);
   the first and second electrical energy storage devices (I, II) each being different types of electrical energy storage devices (I, II), the first storage device (I) for delivering relatively low power flows to the electrical machine (1) over a relatively long time period and the second storage device (II) for delivering relatively high power flows to the electrical machine (1) over a relative short time period.

2. The circuit arrangement according to claim 1, wherein the first storage device (I) for delivering relatively low power flows to the electrical machine (1) over a relatively long time period is an electrical accumulator.

3. The circuit arrangement according to claim 1, wherein the second storage device (II) for delivering relatively high power flows to the electrical machine (1) over a relative short time period is a condenser unit.

4. The circuit arrangement according to claim 1, wherein the switching device (3) is a switchable power semiconductor with a power diode.

5. The circuit arrangement according to claim 4, wherein the power diode is an integrated part of the switching power semiconductor.

6. The circuit arrangement according to claim 1, wherein the switching device (3) is a bi-directionally acting power semiconductor switch.

7. The circuit arrangement according to claim 6, wherein the switching device (3) is designed such that when the electric machine (1) is operating as a generator, recharging of both the first and second storage device (I, II) with electrical energy can take place.

8. The circuit arrangement according to claim 1, wherein the switching device (3) is arranged inside a housing (4) of the DC/AC converter (2).

9. The circuit arrangement according to claim 1, wherein the electric machine (1) is designed so that it can operate as one or more of an electric motor and a generator.

10. The circuit arrangement according to claim 1, wherein the switching device (3) is designed such that when the electric machine (1) is operating as an electric motor, short and high power-peak demands are covered from the first storage device (II), while the second storage device (I) contributes toward supplying electricity to the electric machine (1) mainly for long-lasting power demands.

11. The circuit arrangement according to claim 1, wherein a voltage range of the first storage device (I) and a voltage range of the second storage device (II) overlap, and during substantial operating time fractions voltage in the second storage device (II) is appreciably higher than voltage in the first storage device (I).

12. The circuit arrangement according to claim 11, wherein the voltage range of the first storage device (I) is set to between about 21 V and 28 V, and the voltage range of the second storage device (II) is set to between about 21 V and 48 V but mainly between about 29 V and 48 V.

13. The circuit arrangement according to claim 1, wherein the electric machine (1) is one or more of a drive motor and a generator of a vehicle.

14. A circuit arrangement for the control of at least one electric machine (1), the circuit arrangement comprising:
   a first electrical energy storage device (I);
   a second electrical energy storage device (II) which is a different type of storage device than the first electrical energy storage device (I);
   a DC/AC converter (2); and
   at least one switching device (3) for selectively providing electrical energy from the first and the second electrical energy storage devices (I, II) to the at least one electrical machine (1); and
   the first electrical energy storage device (I) for delivering relatively low power flow to the electrical machine (1) over a relatively long time period while the second storage device (II) for delivering relatively high power flows to the electrical machine (1) over a relative short time period.

* * * * *